(12) United States Patent
Kahl

(10) Patent No.: US 8,857,284 B2
(45) Date of Patent: Oct. 14, 2014

(54) MULTIPLE CLUTCH TRANSMISSION AND VEHICLES AND APPARATUS INCLUDING A MULTIPLE CLUTCH TRANSMISSION

(75) Inventor: Michael E. Kahl, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 443 days.

(21) Appl. No.: 13/394,323

(22) PCT Filed: Sep. 14, 2009

(86) PCT No.: PCT/US2009/056779
§ 371 (c)(1),
(2), (4) Date: Mar. 5, 2012

(87) PCT Pub. No.: WO2011/031268
PCT Pub. Date: Mar. 17, 2011

(65) Prior Publication Data
US 2012/0160044 A1    Jun. 28, 2012

(51) Int. Cl.
*F16H 3/08* (2006.01)
*F16H 3/00* (2006.01)
*F16H 3/093* (2006.01)

(52) U.S. Cl.
CPC .......... *F16H 3/006* (2013.01); *F16H 2200/006* (2013.01); *Y02T 10/76* (2013.01); *F16H 2003/0931* (2013.01)
USPC .............................................. 74/330; 74/331

(58) Field of Classification Search
CPC .............. B60K 6/54; F16D 21/06; F16H 1/00; F16H 3/06; F16H 13/00; F16H 2003/0931; F16H 37/06
USPC .............................. 74/321, 330, 331, 334, 392
See application file for complete search history.

(56) References Cited

U.S. PATENT DOCUMENTS

| | | |
|---|---|---|
| 2,259,730 A | 10/1941 | Burtnett |
| 3,389,614 A | 6/1968 | Shiber et al. |
| 3,426,607 A | 2/1969 | Chivari et al. |
| 4,132,133 A | 1/1979 | Ballendux |
| 4,640,145 A | 2/1987 | Vandervoort |
| 5,085,092 A | 2/1992 | Koga |

(Continued)

FOREIGN PATENT DOCUMENTS

| | | |
|---|---|---|
| DE | 4226578 C1 * | 12/1993 |
| FR | 2700593 A1 | 7/1994 |
| GB | 2036891 A1 | 7/1980 |

OTHER PUBLICATIONS

PatBase Machine translation of Foreign document, DE 4226578 C1.*

(Continued)

*Primary Examiner* — Troy Chambers
*Assistant Examiner* — Thomas Magnuson
(74) *Attorney, Agent, or Firm* — WRB-IP LLP

(57) ABSTRACT

A multi clutch transmission includes a first clutch plate mounted on a first input shaft, a second clutch plate mounted on a second input shaft arranged concentrically around the first input shaft, a third clutch plate mounted on a third input shaft arranged concentrically around the second input shaft, and a clutch housing comprising a plurality of reaction plates, the first, second, and third clutch plates being individually and selectively engageable and disengageable with reaction plates in the clutch housing. A multi clutch transmission can also include at least three countershafts arranged around the input shafts.

17 Claims, 11 Drawing Sheets

(56) References Cited

U.S. PATENT DOCUMENTS

| | | |
|---|---|---|
| 6,401,894 B1 | 6/2002 | Merkel et al. |
| 7,552,658 B2 | 6/2009 | Forsyth |
| 2002/0088288 A1 | 7/2002 | Bowen |
| 2007/0214903 A1 | 9/2007 | Forsyth |
| 2008/0027612 A1 | 1/2008 | Eriksson et al. |
| 2008/0070742 A1 | 3/2008 | Phillips |
| 2008/0134820 A1* | 6/2008 | Bjorck et al. .......... 74/331 |
| 2008/0196543 A1* | 8/2008 | Kobayashi et al. .......... 74/664 |
| 2008/0245166 A1 | 10/2008 | Baldwin |

OTHER PUBLICATIONS

Supp. European Search Report (Feb. 28, 2013) for corresponding European App. EP 09 84 9332.

International Search Report for corresponding International Application PCT/US2009/056779.

* cited by examiner

MULTIPLE CLUTCH TRANSMISSION AND VEHICLES AND APPARATUS INCLUDING A MULTIPLE CLUTCH TRANSMISSION

BACKGROUND AND SUMMARY

The present invention relates to a multiple clutch transmission and to vehicles and apparatus including such a transmission.

It is generally desirable in vehicles to provide a compact transmission. It is also desirable to provide a transmission that can provide small steps between a plurality of gears. It is also desirable to provide a transmission that minimizes power interruption when shifting from gear to gear, or from range to range. It is still further desirable to provide a transmission that can facilitate engine operation within a narrow speed range to minimize fuel consumption and reduce emissions. These characteristics are perhaps even more desirable in vehicles of the heavy duty truck type.

According to a first aspect of the present invention, a multi clutch transmission comprises a first clutch plate mounted on a first input shaft, a second clutch plate mounted on a second input shaft arranged concentrically around the first input shaft, a third clutch plate mounted on a third input shaft arranged concentrically around the second input shaft, and a clutch housing comprising a plurality of reaction plates, the first, second, and third clutch plates being individually and selectively engageable and disengageable with reaction plates in the clutch housing.

According to a second aspect of the present invention, a multi clutch transmission comprises a first clutch plate mounted on a first input shaft, a second clutch plate mounted on a second input shaft arranged concentrically around the first input shaft, a clutch housing comprising a plurality of reaction plates, the first and second clutch plates being individually and selectively engageable and disengageable with reaction plates in the clutch housing, and at least three countershafts arranged around the first and second input shafts.

BRIEF DESCRIPTION OF THE DRAWINGS

The features and advantages of the present invention are well understood by reading the following detailed description in conjunction with the drawings in which like numerals indicate similar elements and in which:

FIG. 2I is a schematic view of a triple clutch transmission according to an aspect of the present invention wherein the transmission is in ninth gear;

DETAILED DESCRIPTION

Figure 1:
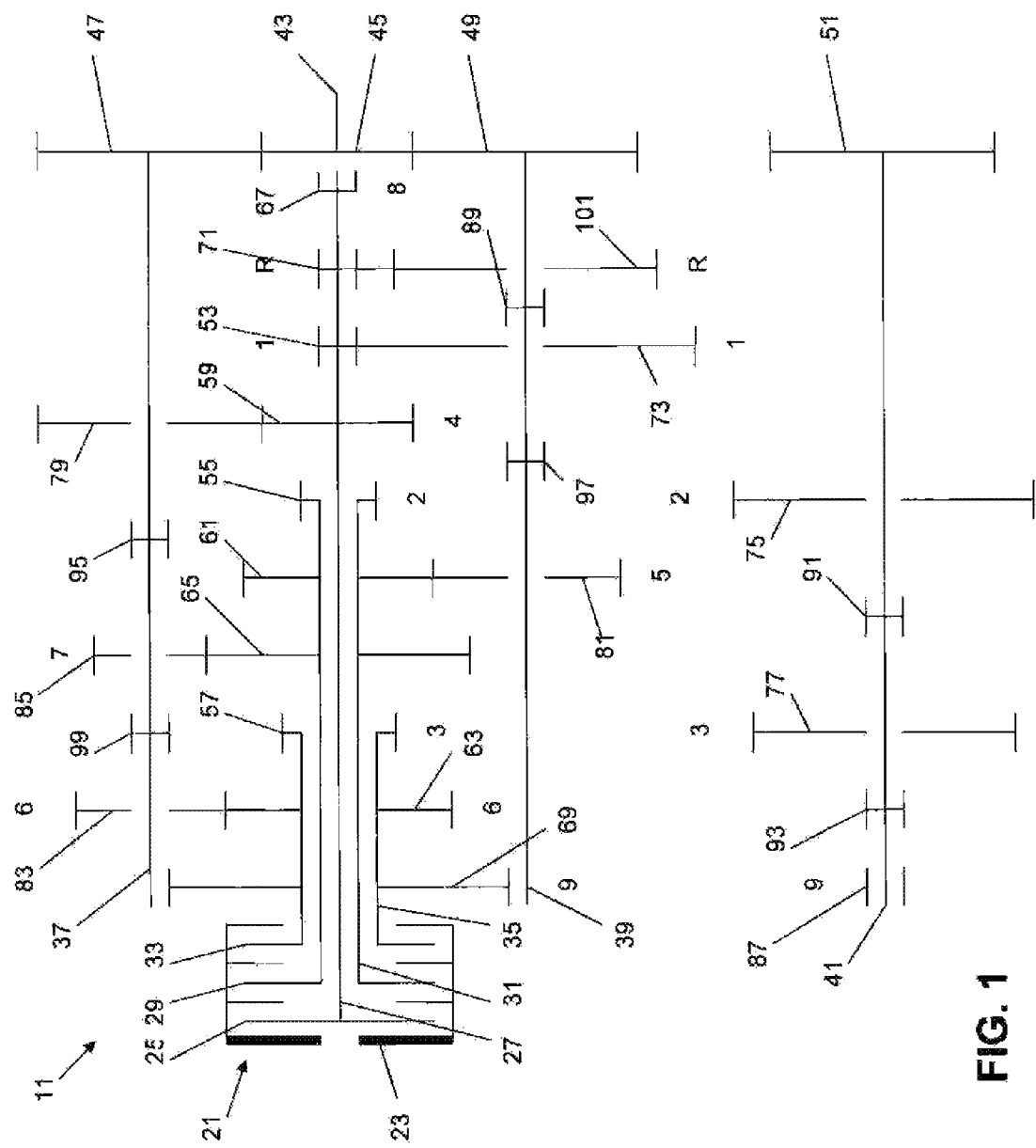
FIG. 1 is a schematic view of a triple clutch transmission according to an aspect of the present invention wherein the transmission is not in gear.

FIG. 1 shows a multi clutch transmission in the form of a triple clutch transmission 11 according to an aspect of the present invention, wherein the transmission is not in gear. The triple clutch transmission 11 comprises a triple clutch 21 comprising a clutch housing 23 that can comprise a flywheel driven by an engine (not shown), a first clutch plate 25 mounted on a first input shaft 27, a second clutch plate 29 mounted on second input shaft 31, and a third clutch plate 33 mounted on a third input shaft 35. The first, second, and third clutch plates 25, 29, and 33 are substantially coaxial, as are the first, second, and third input shafts 27, 31, and 35. The second input shaft 31 is concentrically mounted around the first input shaft 27, and the third input shaft 35 is concentrically mounted around the second input shaft.

Ordinarily, the first, second, and third clutch plates 25, 29, and 33 are non-rotatable relative to the first, second, and third input shafts 27, 31, and 35, respectively, but can be axially moved at least a limited distance along the first, second, and third input shafts, respectively, to engage and disengage with surfaces, i.e., reaction plates, in the clutch housing 25 and thus form first, second, and third clutches, respectively. The first, second, and third clutch plates 25, 29, and 33 can be moved axially relative to the first, second, and third input shafts 27, 31, and 35 via any suitable arrangement, such as through an electronically controlled hydraulic system (not shown) that causes the first, second, and third clutches to engage and disengage in a desired sequence under the control of an electronic control unit. The electronic control unit can be programmed to automatically change gears in the triple clutch transmission 21, such as in response to inputs such as vehicle speed, engine loading, altitude, and throttle position.

Arranged in a planetary fashion around an axis of the first, second, and third input shafts 27, 31, and 35 are first, second, and third countershafts 37, 39, and 41, respectively. A central output shaft 43 includes a central output gear 45 that meshes with first, second, and third countershaft output gears 47, 49, and 51 arranged in a planetary fashion around the central output gear on the first, second, and third countershafts 37, 39, and 41, respectively.

A first drive gear 53, a second drive gear 55, a third drive gear 57, a fourth drive gear 59, a fifth drive gear 61, a sixth drive gear 63, a seventh drive gear 65, a sliding drive clutch 67 for engaging eighth gear, a ninth drive gear 69, and a reverse drive gear 71a are non-rotatably mounted on the input shafts. Specifically, the first drive gear 53, the fourth drive gear 59, the eighth gear sliding mechanical clutch 67, and the reverse drive gear 71a are non-rotatably mounted on the first input shaft 27. The second drive gear 55, the fifth drive gear 61, and the seventh drive gear 65 are non-rotatably mounted on the second input shaft 29. The third drive gear 57, the sixth drive gear 63, and the ninth drive gear 69 are non-rotatably mounted on the third input shaft 31.

A first speed gear 73, a second speed gear 75, a third speed gear 77, a fourth speed gear 79, a fifth speed gear 81, a sixth speed gear 83, a seventh speed gear 85, a ninth speed gear 87, and a reverse speed gear 101 are mounted for rotation on the countershafts and mesh with the first drive gear 53, the second drive gear 55, the third drive gear 57, the fourth drive gear 59, the fifth drive gear 61, the sixth drive gear 63, the seventh drive gear 65, the ninth drive gear 69 on the input shafts, and a second reverse drive gear 71b on another shaft (not shown), respectively.

As seen in FIGS. 2A-2J, to transmit power from an input to the triple clutch 21 to the output shaft 43, one of the first, second, and third clutches is engaged by sliding one of the first, second, and third clutch plates 25, 29, and 33 along a respective first, second, and third input shaft 27, 31, and 35 so the one of the clutch plates engages the rotating clutch housing 23. In the embodiment of the triple clutch transmission shown in the drawings, power is transmitted for all of the gears except for eighth gear by moving a sliding mechanical clutch along a countershaft to couple one of the speed gears to the countershaft on which the sliding mechanical clutch is moved. For eighth gear, the sliding mechanical drive clutch 67 is moved axially relative to the first input shaft 27 and couples directly with the output shaft 43.

Figure 2A:
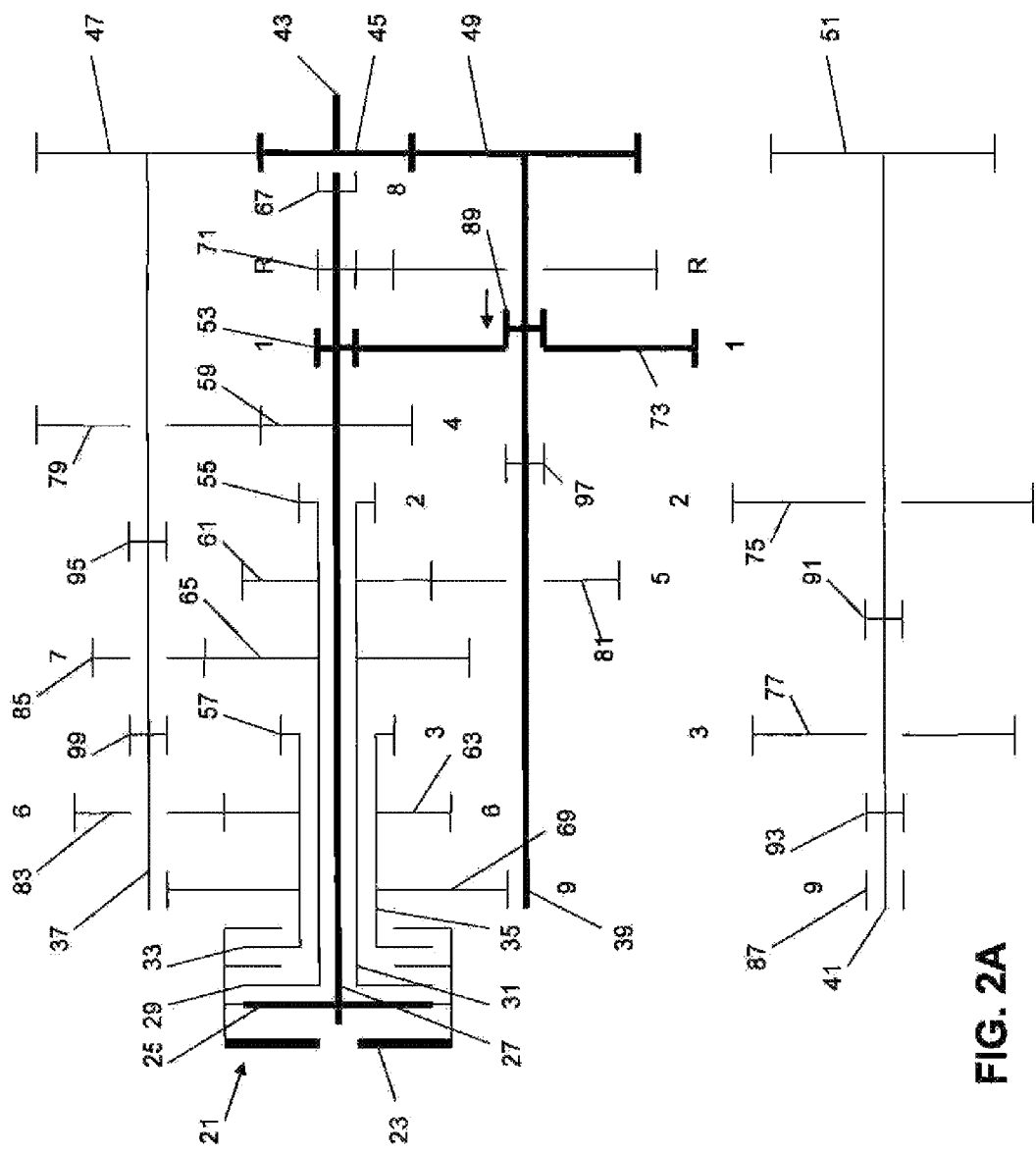
FIG. 2A is a schematic view of a triple clutch transmission according to an aspect of the present invention wherein the transmission is in first gear.

As seen in FIG. 2A, to transmit power in first gear, the first clutch plate 25 is moved to engage with a reaction plate in the rotating clutch housing 23 and a first sliding mechanical clutch 89 on the second countershaft 39 is moved to couple the first speed gear 73 to the second countershaft. Power is transmitted to the output shaft 43 from the second countershaft 39 via the second countershaft output gear 49 and the central output gear 45.

Figure 2B:
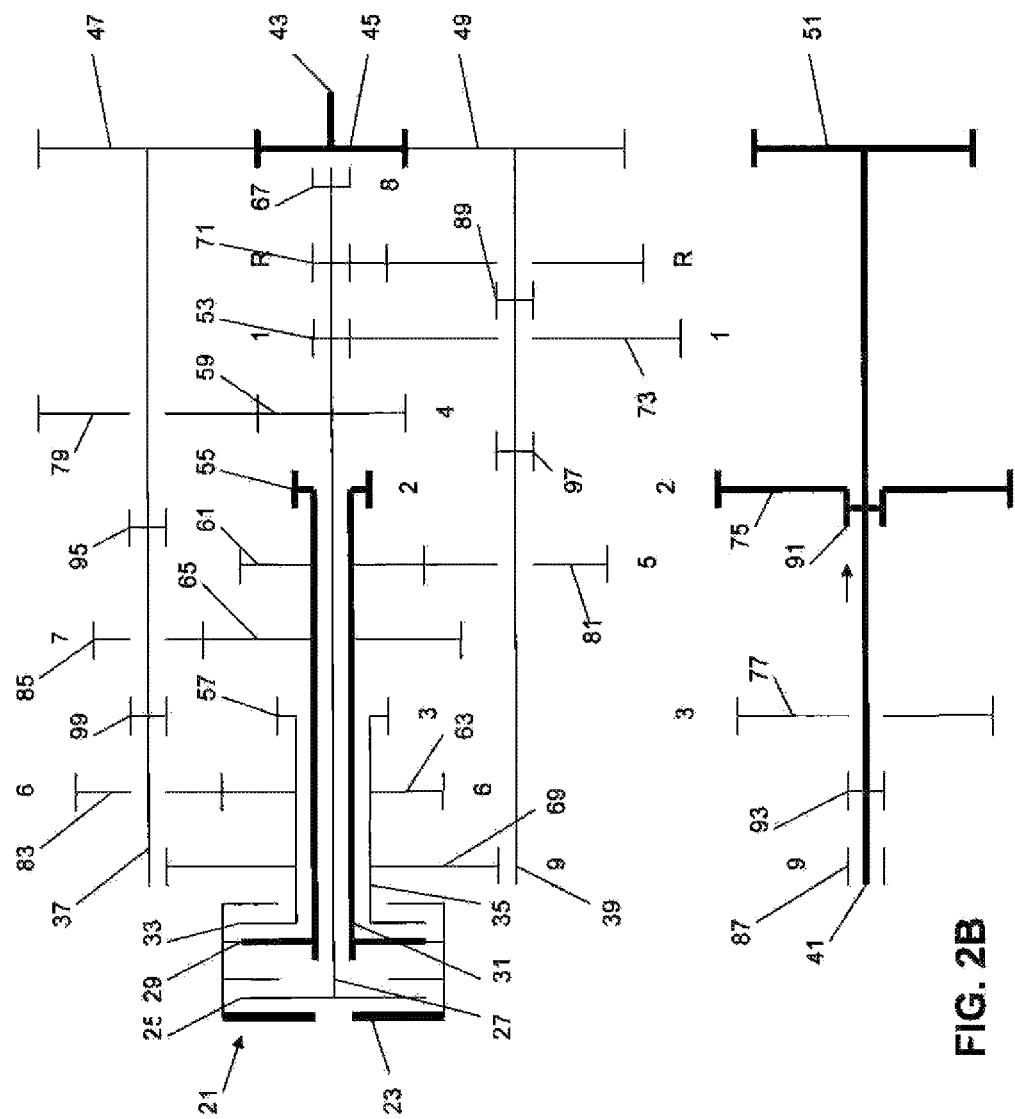
FIG. 2B is a schematic view of a triple clutch transmission according to an aspect of the present invention wherein the transmission is in second gear.

As seen in FIG. 2B, to transmit power in second gear, the second clutch plate 29 is moved to engage with a reaction plate in the rotating clutch housing 23 and a second sliding mechanical clutch 91 on the third countershaft 41 is moved to couple the second speed gear 75 to the third countershaft. Power is transmitted to the output shaft 43 from the third countershaft 41 via the third countershaft output gear 51 and the central output gear 45.

Figure 2C:
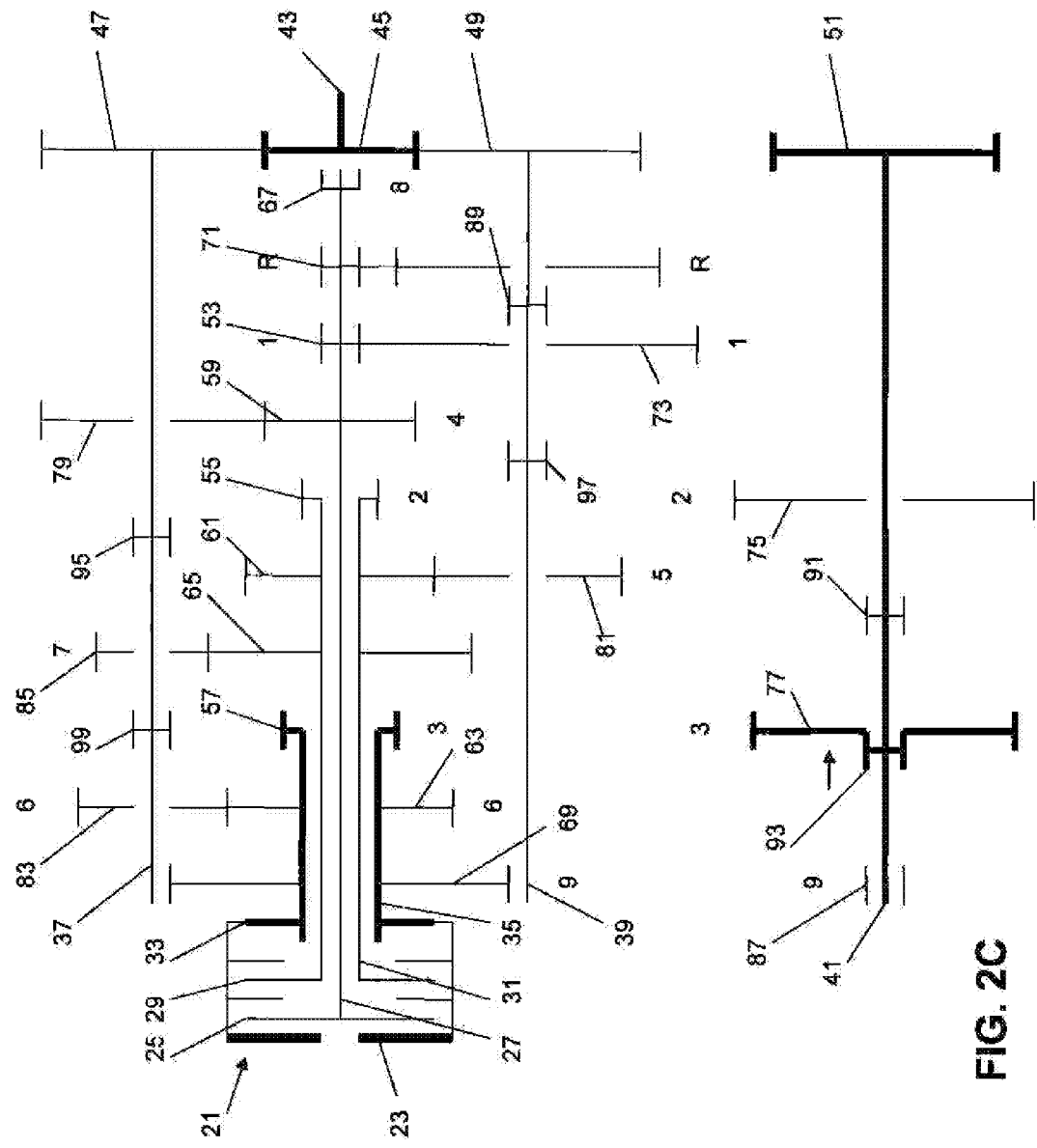
FIG. 2C is a schematic view of a triple clutch transmission according to an aspect of the present invention wherein the transmission is in third gear.

As seen in FIG. 2C, to transmit power in third gear, the third clutch plate 33 is moved to engage with a reaction plate in the rotating clutch housing 23 and a third sliding mechanical clutch 93 on the third countershaft 41 is moved to couple the third speed gear 77 to the third countershaft. Power is transmitted to the output shaft 43 from the third countershaft 41 via the third countershaft output gear 51 and the central output gear 45.

Figure 2D:
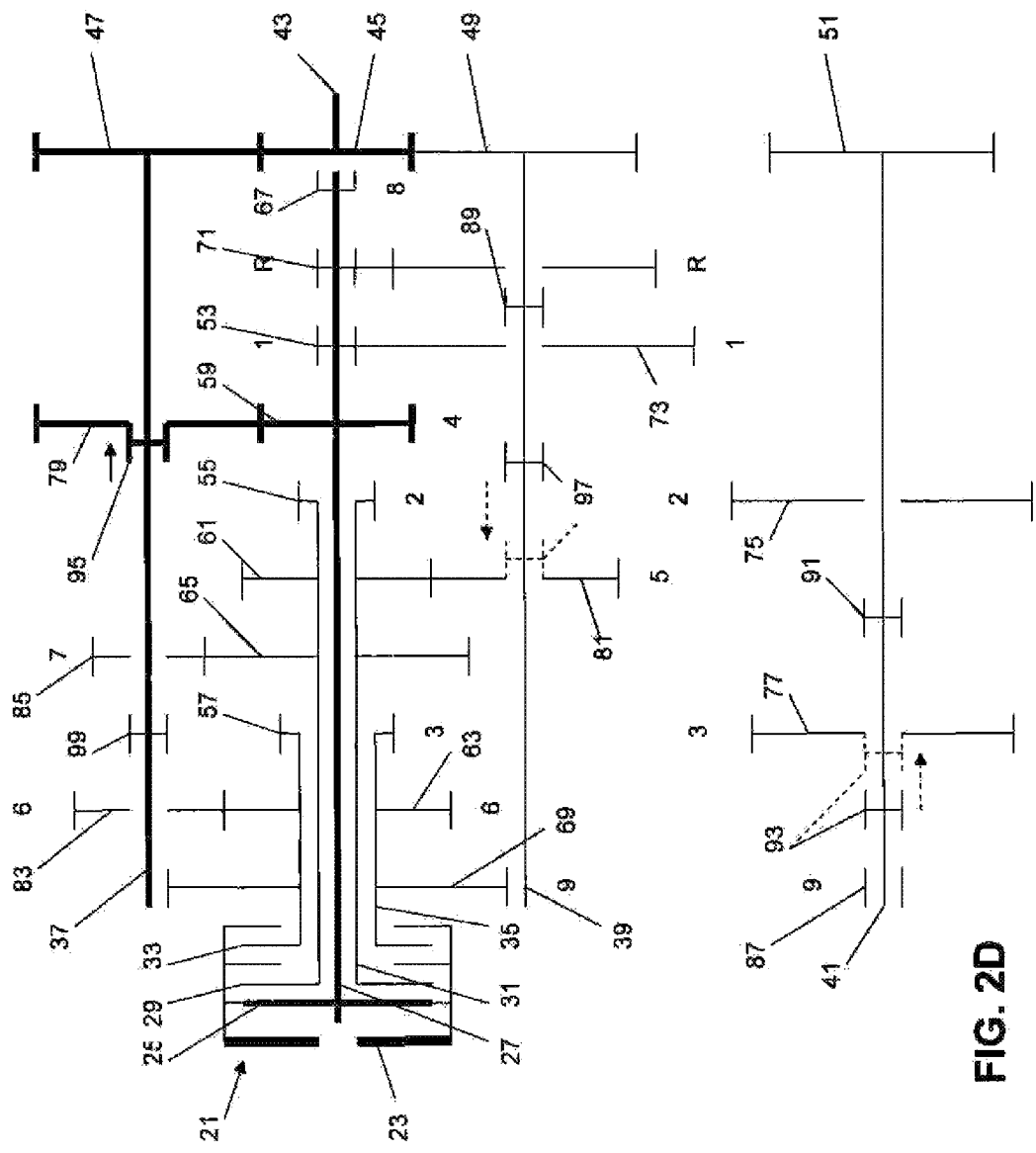
FIG. 2D is a schematic view of a triple clutch transmission according to an aspect of the present invention wherein the transmission is in fourth gear.

As seen in FIG. 2D, to transmit power in fourth gear, the first clutch plate 25 is moved to engage with a reaction plate in the rotating clutch housing 23 and a fourth sliding mechanical clutch 95 on the first countershaft 37 is moved to couple the fourth speed gear 79 to the first countershaft. Power is transmitted to the output shaft 43 from the first countershaft 37 via the first countershaft output gear 47 and the central output gear 45.

Figure 2E:
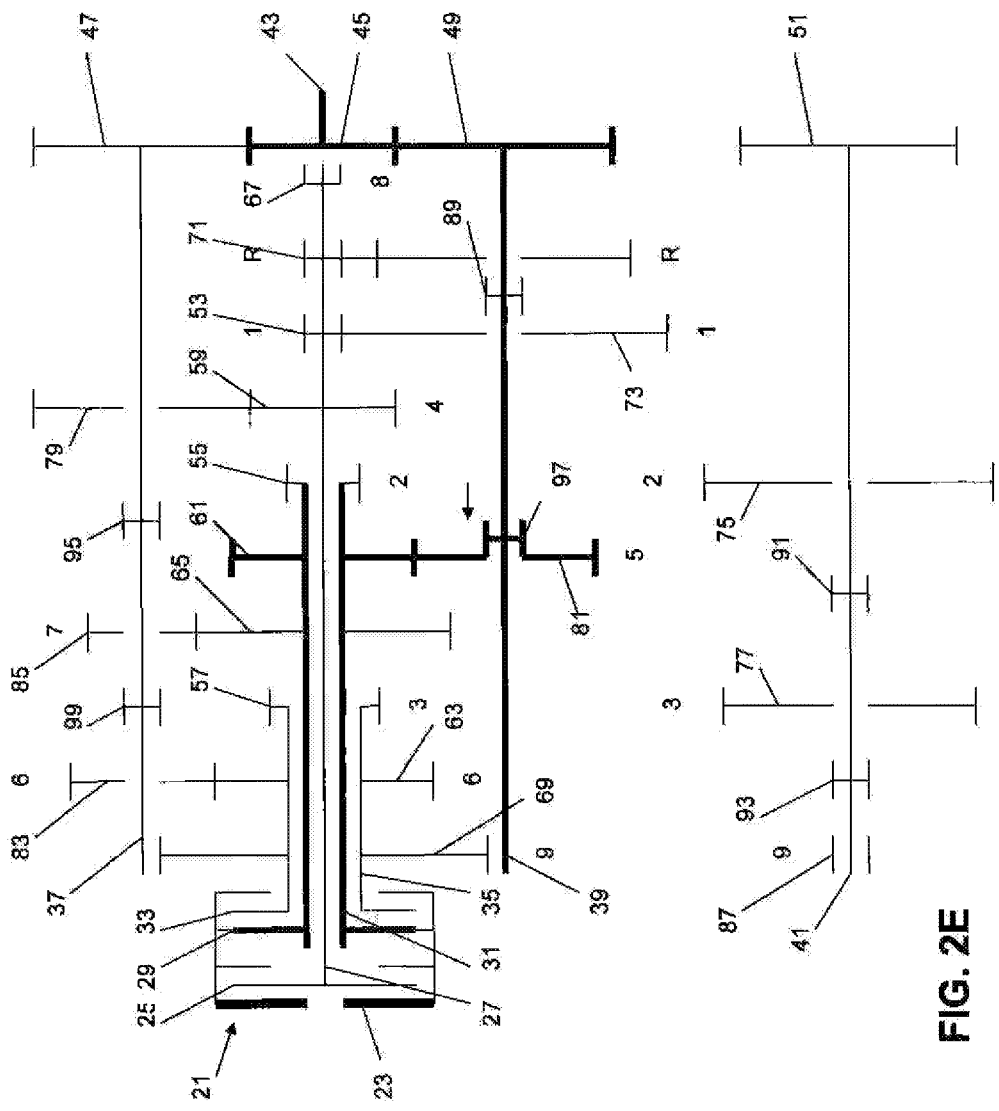
FIG. 2E is a schematic view of a triple clutch transmission according to an aspect of the present invention wherein the transmission is in fifth gear.

As seen in FIG. 2E, to transmit power in fifth gear, the second clutch plate 29 is moved to engage with a reaction plate in the rotating clutch housing 23 and a fifth sliding mechanical clutch 97 on the second countershaft 39 is moved to couple the fifth speed gear 81 to the second countershaft. Power is transmitted to the output shaft 43 from the second countershaft 39 via the second countershaft output gear 49 and the central output gear 45.

Figure 2F:
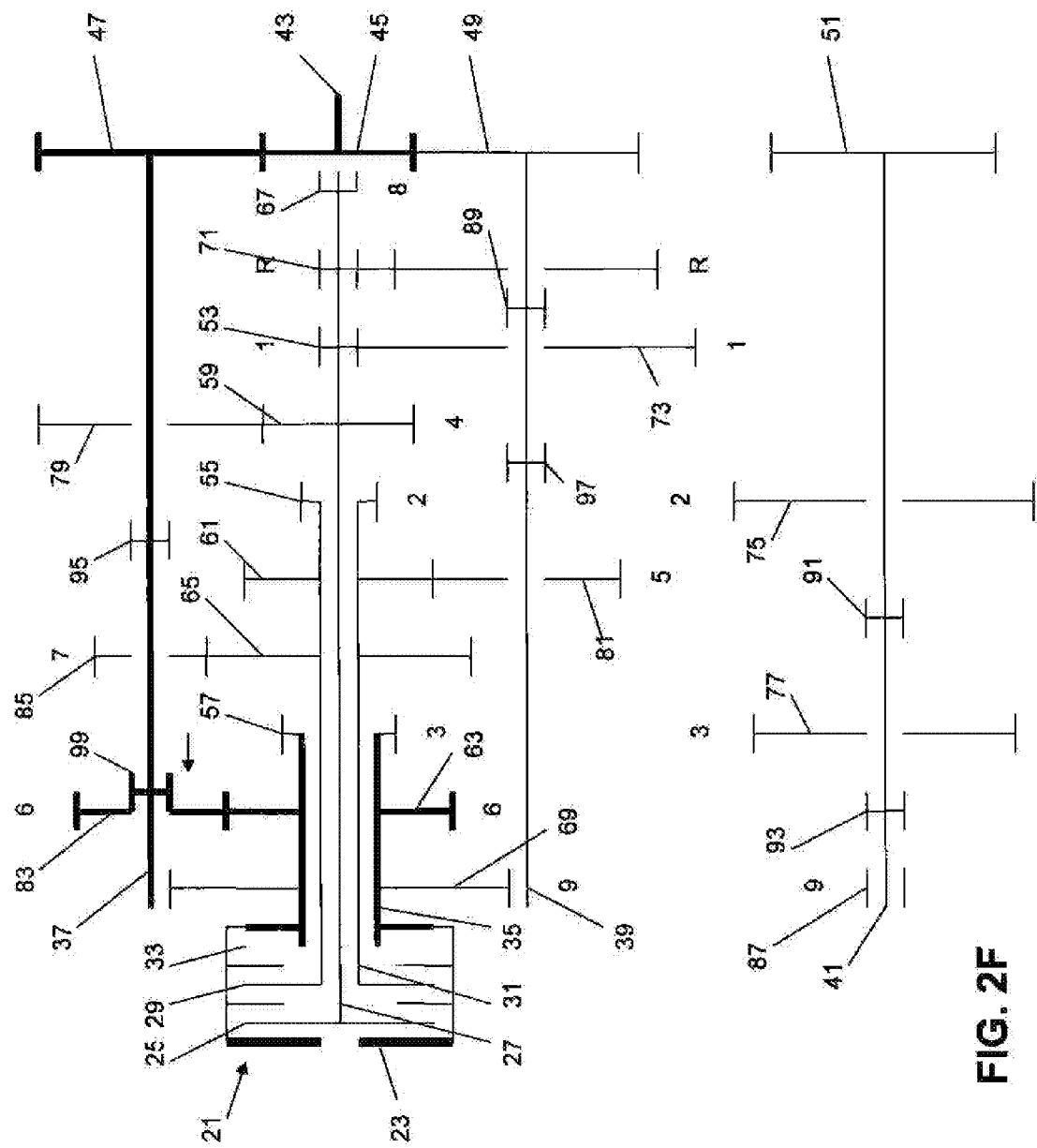
FIG. 2F is a schematic view of a triple clutch transmission according to an aspect of the present invention wherein the transmission is in sixth gear.

As seen in FIG. 2F, to transmit power in sixth gear, the third clutch plate 33 is moved to engage with a reaction plate in the rotating clutch housing 23 and a sixth sliding mechanical clutch 99 on the first countershaft 37 is moved to couple the sixth speed gear 83 to the first countershaft. Power is transmitted to the output shaft 43 from the first countershaft 39 via the first countershaft output gear 47 and the central output gear 45.

Figure 2G:
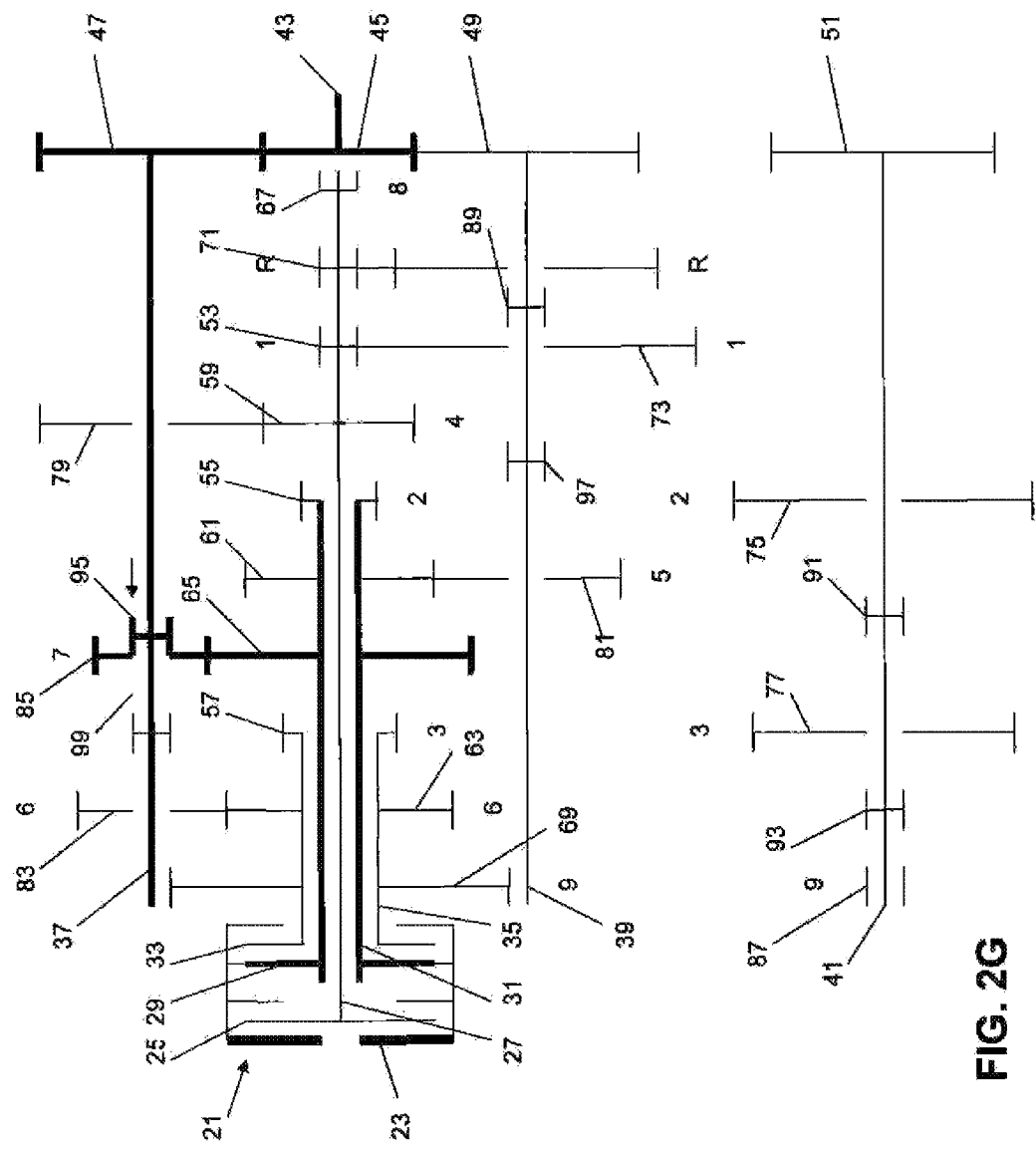
FIG. 2G is a schematic view of a triple clutch transmission according to an aspect of the present invention wherein the transmission is in seventh gear.

As seen in FIG. 2G, to transmit power in seventh gear, the second clutch plate 29 is moved to engage with a reaction plate in the rotating clutch housing 23 and the fourth sliding mechanical clutch 95 on the first countershaft 37 is moved to couple the seventh speed gear 85 to the first countershaft. Power is transmitted to the output shaft 43 from the first countershaft 37 via the first countershaft output gear 47 and the central output gear 45.

Figure 2H:
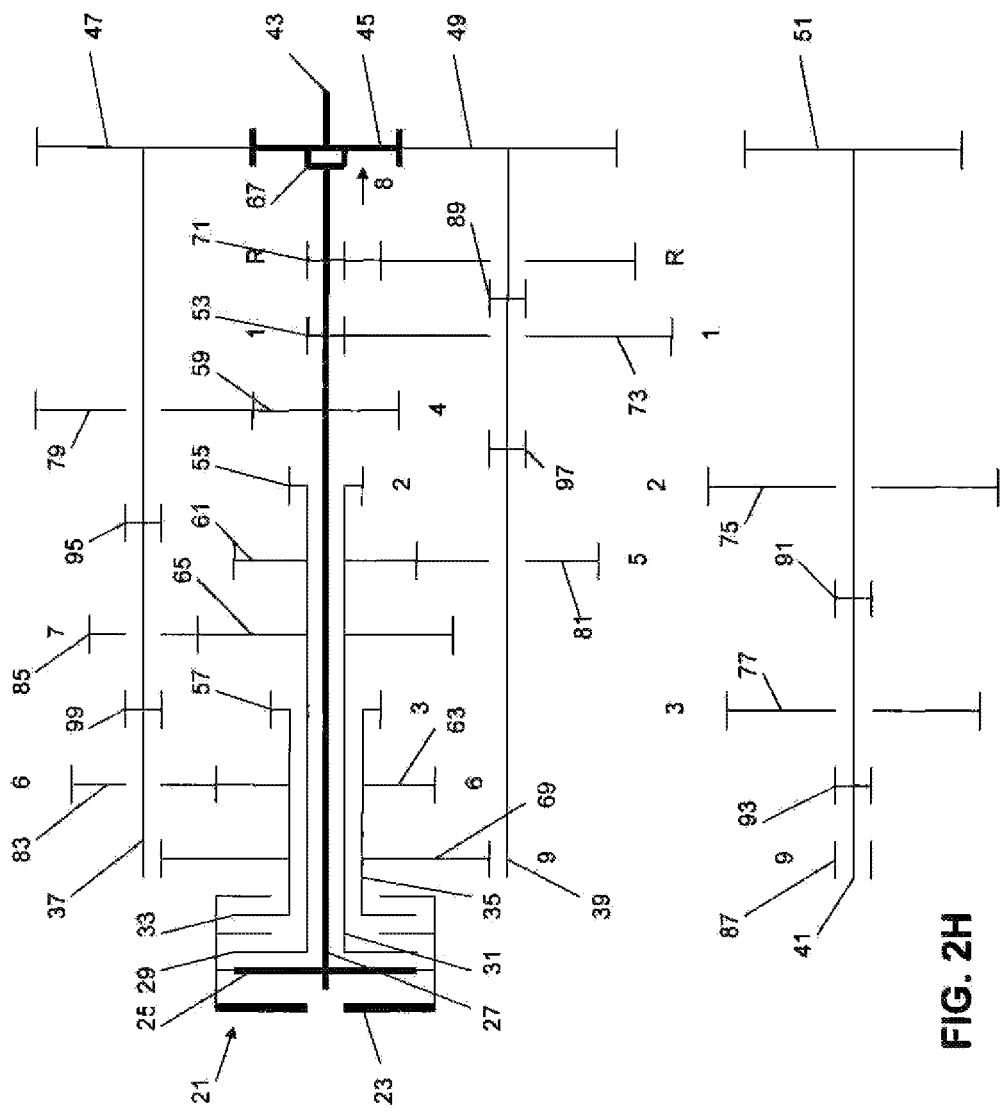
FIG. 2H is a schematic view of a triple clutch transmission according to an aspect of the present invention wherein the transmission is in eighth gear.
Figure 21:
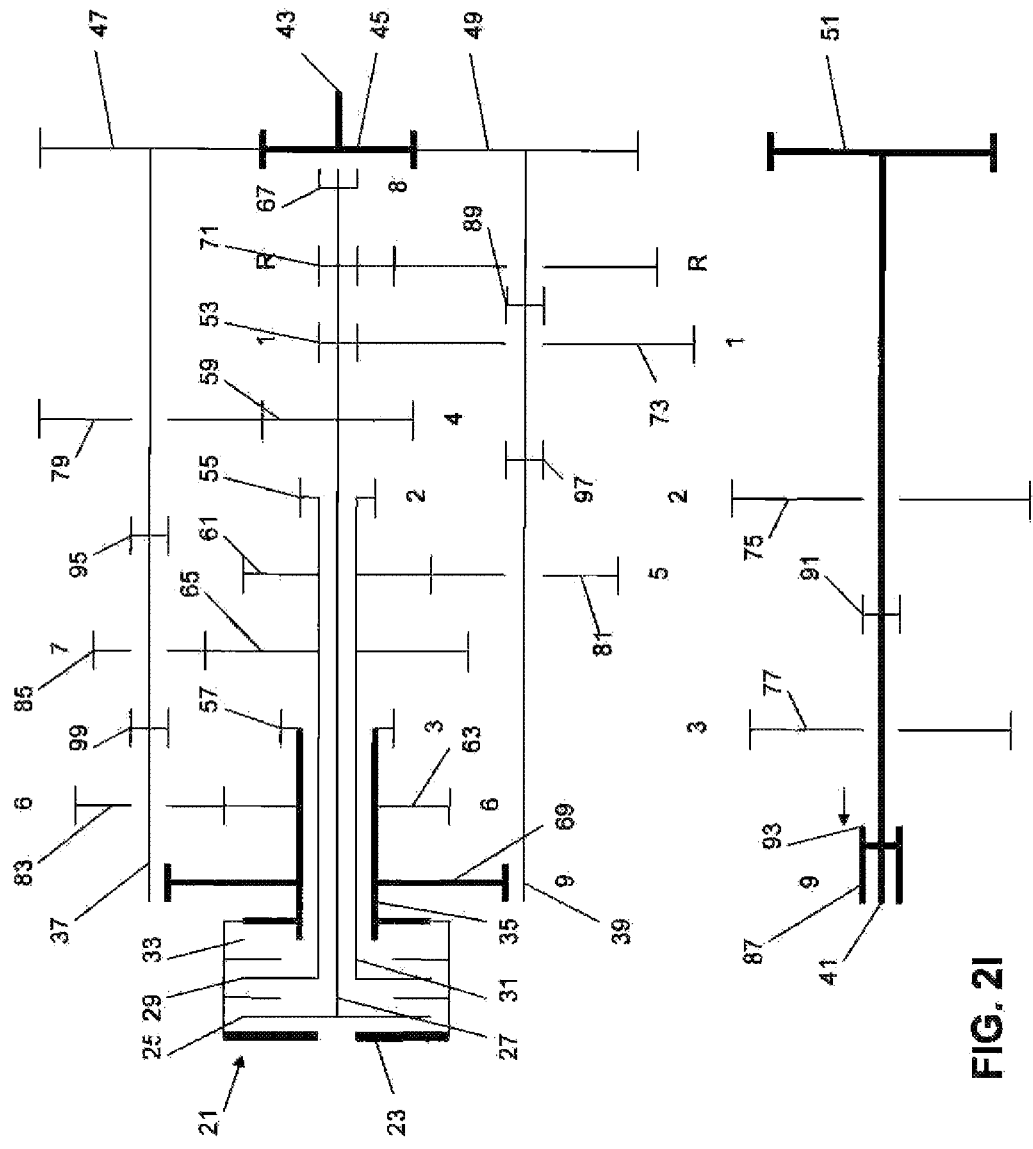

As seen in FIG. 2H, to transmit power in eighth gear, the first clutch plate 25 is moved to engage with a reaction plate in the rotating clutch housing 23 and the eighth gear drive clutch 67 on the first input shaft 27 is moved to couple the first input shaft to the output shaft 43. In trucks and rear wheel drive cars, because of engine, transmission, and rear axle architecture, there is ordinarily always a direct drive such as is used for eighth gear in the illustrated embodiment for one of the forward gears. If it were desired to omit a direct drive in a vehicle, however, eighth gear could, instead by engaged via a drive gear on an input shaft and a speed gear on a countershaft like all of the other gears in the illustrated embodiment.

As seen in FIG. 2I, to transmit power in ninth gear, the third clutch plate 33 is moved to engage with a reaction plate in the rotating clutch housing 23 and the third sliding mechanical clutch 93 on the third countershaft 41 is moved to couple the ninth speed gear 87 to the third countershaft. Power is transmitted to the output shaft 43 from the third countershaft 41 via the third countershaft output gear 51 and the central output gear 45. In the illustrated embodiment, ninth gear can be an overdrive gear, i.e., the driven countershaft 41 turns faster than the driving input shaft 35.

Figure 2J:
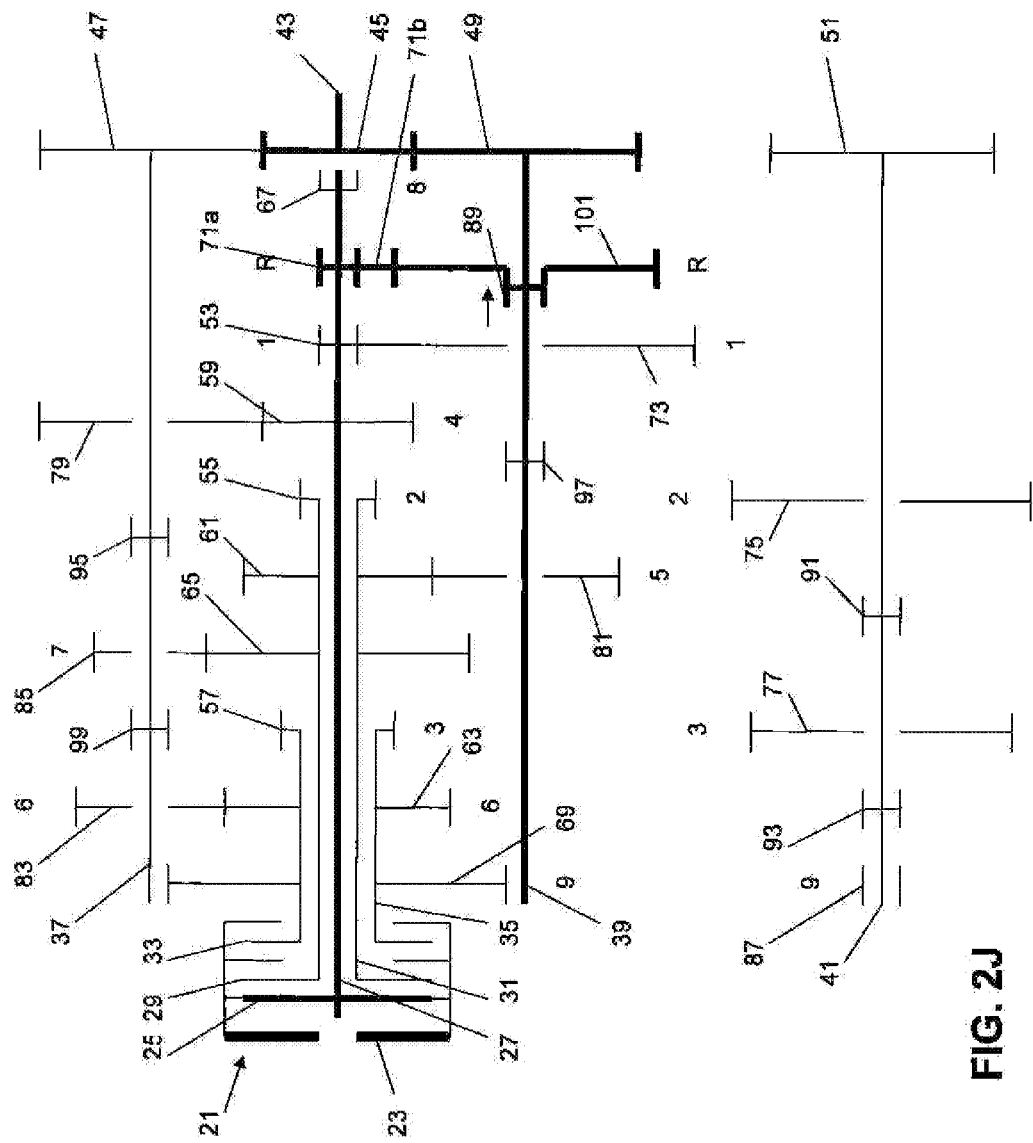
FIG. 2J is a schematic view of a triple clutch transmission according to an aspect of the present invention wherein the transmission is in reverse gear.

As seen in FIG. 2J, to transmit power in reverse gear, the first clutch plate 25 is moved to engage with a reaction plate in the rotating clutch housing 23 and the first sliding mechanical clutch 89 on the second countershaft 39 is moved to couple the reverse speed gear 101 to the second countershaft. The first and second reverse drive gears 71a and 71b cause the reverse speed gear 101 to turn in a direction opposite the direction of the forward gears one through nine. Power is transmitted to the output shaft 43 from the second countershaft 39 via the second countershaft output gear 49 and the central output gear 45. By using the same sliding mechanical clutch 89 to engage either the first drive gear 53 or the reverse drive gear 101, it is not possible to simultaneously engage first and reverse gear.

By facilitating smooth shifting of gears via small steps, clutch life can be extended, particularly where heavy duty truck levels of horsepower are concerned. Additionally, there is no need for range selection as in typical heavy duty truck transmissions and therefore no range change power interruption. Moreover, smooth shifting of gears via small steps in the multi clutch transmission can facilitate engine operation within a narrow speed range, which can result in lower fuel consumption and reduced emissions, improved vehicle acceleration, and improved engine braking. The multi clutch transmission is also believed to be of particular use in hybrid applications which ordinarily require an automatic transmission that can be arranged to communicate with an internal combustion engine and an electric motor/generator.

To minimize interruption of power during shifting from one forward gear to another, when power is being transmitted through one of the forward speed gears, the sliding mechanical clutches for at least some of the other gears can be individually and selectively controlled via the control unit to couple the gears to their respective countershafts. For example, if the transmission is in fourth gear, i.e., the first clutch is engaged and the fourth sliding mechanical clutch 95 couples the fourth speed gear 79 to the first countershaft 37, as shown in phantom in FIG. 2D the third sliding mechanical clutch 93 can couple the third speed gear 77 to the third countershaft 41 and the fifth sliding mechanical clutch 97 can couple the fifth speed gear 81 to the second countershaft 39. In this way, shifting from fourth gear up or down one gear is accomplished smoothly and quickly by disengaging the first clutch and engaging the second or third clutch.

If desired, still other ones of the sliding mechanical clutches can couple still other ones of the speed gears to their respective countershafts to facilitate minimizing power transmission interruption when not shifting to an immediately higher or lower gear. For example, in FIG. 2D, the sliding clutch 99 can couple the sixth speed gear 83 to the first countershaft 37 while the fourth speed gear 79 is also coupled to the first countershaft and is driven by the fourth drive gear 59.

In the illustrated embodiment, it would not be appropriate to couple the first input shaft 27 with the output shaft 43 via the eighth gear sliding mechanical drive clutch 67 while the first clutch is engaged and power is transmitted through any other drive gears mounted on the first input shaft, here, first, fourth, or reverse gears. The electronic control unit will thus ordinarily be programmed to prevent simultaneous engagement of the eighth gear sliding mechanical drive clutch 67 and the output shaft 43 while any of the speed gears that are driven by drive gears on the first input shaft are coupled to their respective countershafts by sliding mechanical clutches.

If, as in the illustrated embodiment, some of the sliding mechanical clutches couple two speed gears to countershafts, not all of the speed gears can be coupled to their respective countershafts at the same time. For example, in the illustrated embodiment, the first sliding mechanical clutch 89 is used to couple both the first speed gear 73 and the reverse speed gear 101 to the second countershaft, the third sliding mechanical clutch 93 is used to couple both the third speed gear 77 and the ninth speed gear 87 to the third countershaft, and the fourth sliding mechanical clutch 95 is used to couple both the fourth speed gear 79 and the seventh speed gear 85 to the first countershaft 37. If it is desired to couple such speed gears to their respective countershafts, dedicated sliding mechanical clutches can be provided for each gear.

The embodiment in FIGS. 1-2J illustrates an aspect of the invention in the form of a triple clutch transmission. It will be appreciated, however, that the invention is not limited to triple clutch transmissions. For example, transmissions having four or more clutches associated with respective, concentric, coaxial input shafts and having four or more countershafts may also be provided utilizing the principles described herein. In addition, the number of countershafts need not equal the number of clutches.

The illustrated embodiment can facilitate providing a compact, multi speed transmission. While other configurations are possible, by providing the first clutch plate 25 proximate a first end of the first input shaft and an end of the output shaft proximate a second end the first input shaft, dimensions of the transmission can be limited in a direction transverse to the axis of the first input shaft.

While the multi clutch transmission is considered to have particular application in vehicles such as heavy duty trucks, the multi clutch transmission may be useful in other, non-vehicular apparatus that involve power transmission.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A multi clutch transmission, comprising:
a first clutch plate mounted on a first input shaft;
a second clutch plate mounted on a second input shaft arranged concentrically around the first input shaft;
at third clutch plate mounted on a third input shaft arranged concentrically around the second input shaft;
a clutch housing comprising a plurality of reaction plates, the first, second, and third clutch plates being individually and selectively engageable and disengageable with reaction plates in the clutch housing;
an output shaft non-rotatably coupled to an output gear; and
at least three countershafts arranged around the first, second, and third input shafts, at last one countershaft of the at least three countershafts being associated with a respective one of the first, second, and third input shafts, each countershaft being non-rotatably coupled to a countershaft gear meshing with the output gear.

2. The multi clutch transmission as set forth in claim 1, comprising a plurality of drive gears, at least one drive gear being non-rotatably mounted on each of the first, second, and third input shafts, a plurality of speed gears, at least one speed gear being mounted for rotation on each of the plurality of countershafts and meshing with a respective one of the plurality of drive gears, and a plurality of sliding mechanical clutches, at least one sliding mechanical clutch being provided on each countershaft, each sliding mechanical clutch being arranged to individually and selectively couple and decouple one or more speed gears on a countershaft of the plurality of countershafts to the countershaft.

3. The multi clutch transmission as set forth in claim 2, wherein the first clutch plate is disposed proximate a first end of the first input shaft and an end of the output shaft is disposed proximate a second end the first input shaft.

4. The multi clutch transmission as set forth in claim 2, comprising a sliding mechanical clutch provided on at least one of the first, second, and third input shafts for directly coupling the at least one of the first, second, and third input shafts to the output shaft.

5. The multi clutch transmission as set forth in claim 2, comprising a control unit for controlling individual and selective engagement of the first, second, and third clutch plates with reaction plates in the clutch housing and for controlling individual and selective coupling and decoupling of speed gears with countershafts via the plurality of sliding mechanical clutches so that, when one of the first, second, and third clutch plates is engaged with a reaction plate, two or more sliding mechanical clutch plates on different ones of the plurality of countershafts couple speed gears to the different ones of the countershafts.

6. The multi clutch transmission as set forth in claim 5, wherein the control unit controls individual and selective engagement of the first, second, and third clutch plates with reaction plates and individual and selective coupling and decoupling of speed gears with countershafts via the plurality of sliding mechanical clutches so that, when a first one of the first, second, and third clutch plates is in engagement with a reaction plate and drives a respective first one of the first, second, and third input shafts, and a first one of the sliding mechanical gears couples a first one of the plurality of speed gears to a first one of the plurality of countershafts, the first one of the speed gears meshing with a first one of the drive gears on the first one of the input shafts, and, at the same time, a second one of the sliding mechanical gears couples a second one of the speed gears to one of the plurality of countershafts, the second one of the speed gears meshing with a second one of the drive gears on one of the first, second, and third input shafts other than the first one or the input shafts.

7. The multi clutch transmission as set forth in claim 6, wherein the control unit controls individual and selective coupling and decoupling of speed gears with countershafts via the plurality of sliding mechanical clutches so that, while the first one of the sliding mechanical gears couples the first one of the plurality of speed gears to the first one of the plurality of countershafts, a third one of the sliding mechanical gears couples a third one of the speed gear to one of the plurality of countershafts, the third one of the speed gears meshing with a third one of the drive gears on one of the first, second, and third input shafts other than the first one of the input shafts.

8. The multi clutch transmission as set forth in claim 7, wherein the control unit controls individual and selective coupling and decoupling of speed gears with countershafts via the plurality of sliding mechanical clutches so that, while the first one of the sliding mechanical gears couples the first one of the plurality of speed gears to the first one of the plurality of countershafts, a fourth one of the sliding mechanical gears couples a fourth one of the speed gears to the second one of the plurality of countershafts, the fourth one of the speed gears meshing with a fourth one of the drive gears on one of the first, second, and third input shafts other than the first one of the input shafts.

9. The multi clutch transmission as set forth in claim 7, wherein the first, second, and third ones of the drive gears and speed gears are successive drive gears and speed gears among a plurality of drive gears and speed gears.

10. The multi clutch transmission as set forth in claim 7, wherein the first, second, and third ones of the drive gears and speed gears are non-successive drive gears and speed gears among a plurality of drive gears and speed gears.

11. A multi clutch transmission, comprising:
a first clutch plate mounted on a first input shaft;
a second clutch plate mounted on a second input shaft arranged concentrically around the first input shaft;
a clutch housing comprising a plurality of reaction plates, the first and second clutch plates being individually and selectively engagable and disengageable with reaction plates in the clutch housing;
an output shaft non-rotatably coupled to an output gear; and
at least three countershafts arranged around the first and second input shaft, at least one countershaft of the at least three countershafts being associated with a respective one of the first and second input shafts, each countershaft being non-rotatably coupled to a countershaft gear meshing with the output gear.

12. The multi clutch transmission as set forth in claim 11, comprising a plurality of drive gears, at least one drive gear being non-rotatably mounted on each of the first and second input shafts, a plurality of speed gears, at least one speed gear being mounted for rotation on each of the at least three countershafts and meshing with a respective one of the plurality of drive gears, and a plurality of sliding mechanical clutches, at least one sliding mechanical clutch being provided on each countershaft, each sliding mechanical clutch being arranged to individually and selectively couple and decouple one or more speed gears on a countershaft of the at least three countershafts to the countershaft.

13. The multi clutch transmission as set forth in claim 12, wherein the first clutch plate is disposed proximate a first end of the first input shaft and an end of the output shaft is disposed proximate a second end the first input shaft.

14. The multi clutch transmission as set forth in claim 12, comprising a sliding mechanical clutch provided on at least one of the first and second input shafts for directly coupling the at least one of the first and second input shaft to the output shaft.

15. The multi clutch transmission as set forth in claim 11, comprising a control unit for controlling individual and selective engagement of the first and second clutch plate with reaction plates in the clutch housing and for controlling individual and selective coupling and decoupling of speed gears with countershafts via the plurality of sliding mechanical clutches so that, when one of the first and second clutch plates is engaged with a reaction plate, two or more sliding mechanical clutch plates on different ones of the at least three countershafts couple speed gears to the different ones of the countershafts.

16. The multi clutch transmission as set forth in claim 15, wherein the control unit controls individual and selective engagement of the first and second clutch plates with reaction plates and individual and selective coupling and decoupling of speed gears with countershaft via the plurality of sliding mechanical clutches so that, when a first one of the first and second clutch plates in engagement with a reaction plate and drives a respective first one of the first and second input shafts, and a first one of the sliding mechanical gears couples a first one of the plurality of speed gears to a first one of the at least three countershafts, the first one of the speed gears meshing with a first one of the drive gears on the first one of the input shafts, and, at the same time, a second one of the sliding mechanical gears couples a second one of the speed gears to one of the at least three countershafts, the second one of the speed gears meshing with a second one of the drive gear on a second one of the input shafts other than the first one of the first and second input shafts.

17. The multi clutch transmission as set forth in claim 16, wherein the control unit controls individual and selective coupling and decoupling of speed gears with countershafts via the plurality of sliding mechanical clutches so that, while the first one of the sliding mechanical gears couples the first one of the plurality of speed gears to the first one of the plurality of countershafts, a third one of the sliding mechanical gears couples a third one of the speed gears to one of the plurality of countershafts, the third one of the speed gears meshing with a third one of the drive gears on a second one of the first and second input shafts other than the first one of the first and second input shafts.

* * * * *